United States Patent [19]
Sakurai et al.

[11] Patent Number: 4,941,206
[45] Date of Patent: Jul. 10, 1990

[54] LOOP-TYPE OPTICAL FIBER TRANSMISSION SYSTEM HAVING MASTER AND SLAVE APPARATUS

[75] Inventors: Tsutomu Sakurai, Ikoma; Yoshifumi Hara, Hirakata; Yasumasa Dougakiuchi, Kadoma, all of Japan

[73] Assignee: Matsushita Electric Industrial Co., Ltd., Kadoma, Japan

[21] Appl. No.: 276,514

[22] Filed: Nov. 28, 1988

[30] Foreign Application Priority Data

Nov. 27, 1987 [JP]  Japan ................... 62-300766

[51] Int. Cl.⁵ ............................. H04B 9/00
[52] U.S. Cl. ................... 455/607; 455/600; 455/617
[58] Field of Search .......... 455/606, 607, 603, 608, 455/609, 610, 611, 612, 613, 617, 618, 619, 600; 370/1, 3, 4

[56] References Cited

U.S. PATENT DOCUMENTS 4,501,021  2/1985  Weiss ................... 455/607

FOREIGN PATENT DOCUMENTS 0086940  5/1985  Japan ................... 455/608

Primary Examiner—Benedict V. Safourek
Assistant Examiner—L. Van Beek
Attorney, Agent, or Firm—Cushman, Darby & Cushman

[57] ABSTRACT

In a loop-type optical fiber transmission system composed of a master apparatus (50) and a plurality of slave apparatus (54), when an intensity of incident light (6B, 6C, 6E) to a first slave apparatus (55) is insufficient, the first slave apparatus (55) sends a status signal ($CS_b$) informing malfunction in the light intensity to the master apparatus (50), the master apparatus upon receipt of the status signal from the first slave apparatus (55) sends a command signal to increase an output light intensity of a second slave apparatus (54) which is positioned at the upper stream of the first slave apparatus (55), and thus the intensity of the output light from the second slave apparatus (54) is increased.

16 Claims, 13 Drawing Sheets

FIG.6 (a-1)

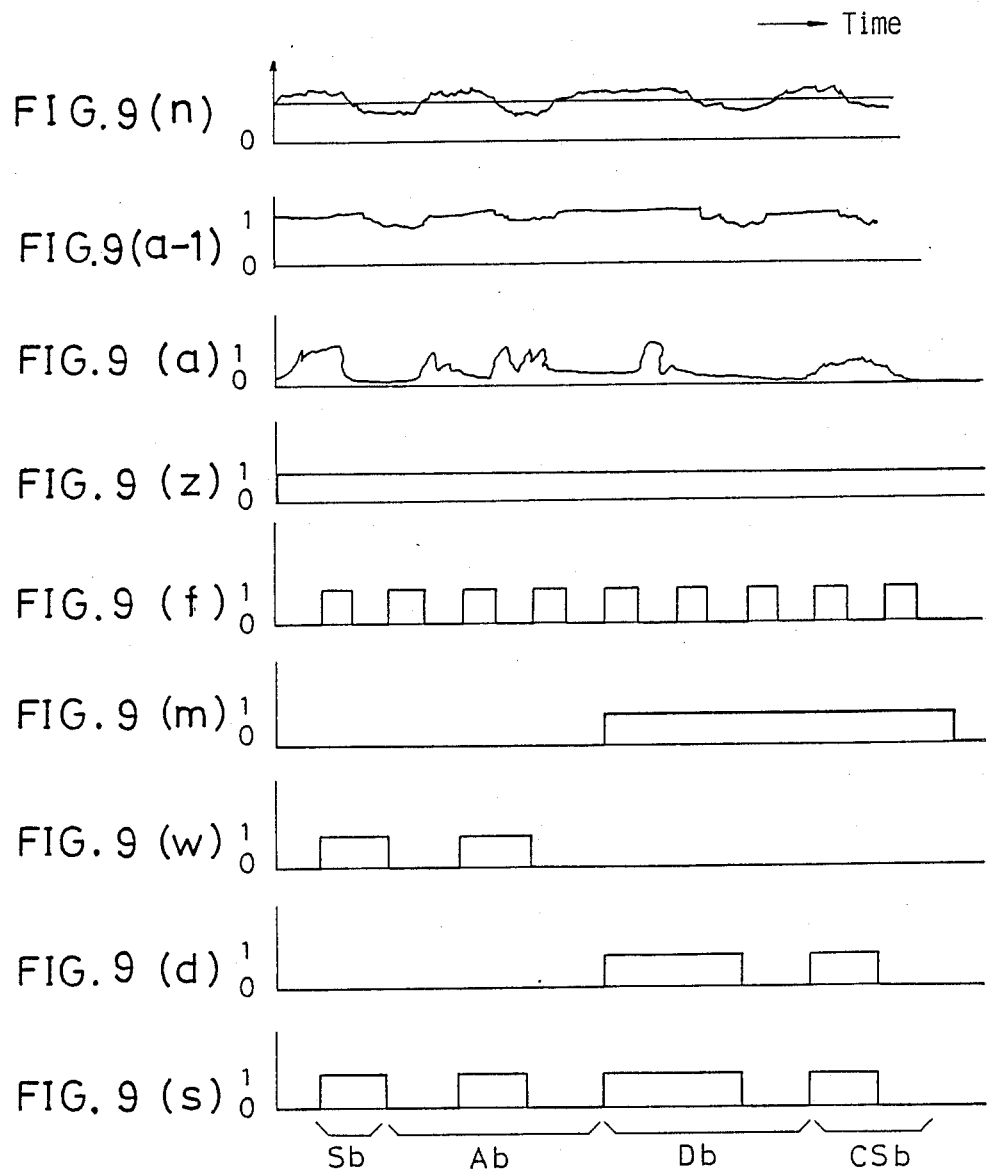

LOOP-TYPE OPTICAL FIBER TRANSMISSION SYSTEM HAVING MASTER AND SLAVE APPARATUS

FIELD OF THE INVENTION AND RELATED ART STATEMENT

1. Field of the Invention

The present invention relates generally to an optical fiber transmission apparatus, and more particularly to a loop-type optical fiber transmission system in which a master apparatus and a plurality of slave apparatus are connected in series with one loop-type optical fiber transmission line, and a serial digital signal is transmitted between the master apparatus and the slave apparatus.

2. Description of the Related Art

Recently, a computer control system using a microprocessor have been introduced into an automated manufacturing system to be used in a factory, and in the accompany of advance in its ability or function, it is often that sensors and actuators of over one hundred are used in such automated manufacturing system. Moreover, a traffic of communication between a master control computer and each apparatus in factory is increasing, and increase of the traffic results in an increase of number of wiring which is required between them. In order to decrease the wiring connecting the above-mentioned master control computer with the various apparatus and improve noise-resistance ability, an optical remote I/O system has been introduced in the manufacturing system. The optical remote I/O system is composed of a master apparatus having a control microprocessor and a plurality of slave apparatus having an input/output control unit. Sensors and actuators are connected to the slave apparatus, and the respective slave apparatus and the master apparatus are coupled with one loop-type optical fiber line. Communication between the master apparatus and each slave apparatus is accomplished by transmission of coded optical signals through the optical fiber.

FIG. 10 is a block diagram showing the optical remote I/O system in a conventional art. Referring to FIG. 10, a plurality of sensors 1 are coupled with a slave apparatus 3, and a plurality of actuators 2 are coupled with a slave apparatus 4. The slave apparatus 3 is coupled in series with the slave apparatus 4 by an optical fiber 6A, and a master apparatus 5 is coupled in series with the slave apparatus 3 and 4 by optical fibers 6. In the above-mentioned block diagram, a control information transmitted from the master apparatus 5 is received by the slave apparatus 3 in the first place through the optical fiber 6, and then the control information is transmitted to the slave apparatus 4 through the optical fiber 6A. In this way, the control information is transmitted to the respective slave apparatus in a preliminarily arranged order via the optical fiber 6A. A slave apparatus takes in the control information addressed to the slave apparatus.

FIG. 11 is the block diagram of the slave apparatus in the conventional art. The control information from the master apparatus is transmitted to the slave apparatus by a serial digital signal of a format as shown in FIG. 12, for example. The format comprises start bits for detecting a head of the serial digital signal, address bits for representing specific slave apparatus and data bits for representing data.

Referring to FIG. 11, an input optical signal transmitted with the optical fiber 6 is converted to an electric signal by a photoelectric converter 7 and is applied to a shift register 14 for serial-parallel conversion. Sensors 1 are coupled to an input apparatus 13, and actuators 2 are coupled to an output apparatus 17a.

The address distinguishing the slave apparatus from other slave apparatus is set with switches 16. A received serial digital signal is memorized in the shift register 14, and then the address bits of the serial digital signal are applied to an address detecting circuit 15. The address detecting circuit 15 detects address by coincidence between the address which is set with the switches 16 and an address in the serial digital signal transmitted through the optical fiber 6. When the transmitted address coincides with the address of the slave apparatus, access of the slave apparatus is recognized, and data in the data bits of the serial digital signal is memorized in an output latch 17. Subsequently, the data bits of the serial digital signal memorized in the shift register 14 is replaced with input data from the sensor 1, and a transmission signal 10 to be transmitted to the master apparatus 5 is generated by parallel-serial conversion in the shift register 14. When the address of the transmitted serial digital signal does not coincide with the address of the slave apparatus, the serial digital signal passes the shift register 14 and is converted to an optical signal by the photoelectric converter 9, and is transmitted to the next successive slave apparatus via an optical fiber 6A. The shift register 14, the output latch 17 and other circuit are controlled by a clock pulse generated in a timing pulse generating circuit 18.

As mentioned above, the serial digital signal transmitted from the master apparatus 5 is received by the slave apparatus 3, and subsequently transmitted from slave apparatus 3 to the slave apparatus 4. The slave apparatus accessed from the master apparatus 5 receives information from the master apparatus 5, and send an input data of the slave apparatus to the master apparatus, and thereby communication between the master apparatus 5 and the slave apparatus 3 or 4 is carried out.

In the above-mentioned slave apparatus, in order to maintain stable operation in the photoelectric converter, a predetermined level of light intensity is required at the photoelectric converter 7. The light intensity at the photoelectric converter 7 of each slave apparatus is generally measured with a light power meter.

On the other hand, a transmittance of the optical fiber is influenced by radius of bending thereof or connecting condition of optical connectors. Moreover, measured result of light intensity is varied depending on measuring method, and thus negligible amount of effort is required to measure the light intensity with the light power meter.

In case that a bending force is continuously applied to an optical fiber mounted on an apparatus, for example, the radius of bending of the optical fiber becomes progressively smaller by creep effect of the glass fiber, and the transmittance is deteriorated. Then, operation of the apparatus which is normal at the beginning gradually falls into malfunction. The disadvantage indicated above may result in a severe accident in fabricating equipment using robots, because of repeated load which is applied to the optical fiber in the accompany of moving of the arm of the robot.

OBJECT AND SUMMARY OF THE INVENTION

An object of the present invention is to provide a loop-type optical fiber transmission system in which a master apparatus can detect a slave apparatus which does not receive an optical signal having a predetermined light intensity, on the basis of address and information for informing abnormal state of a received light intensity and an address information distinguishing the slave apparatus.

The present invention can provide a loop-type optical fiber transmission system wherein an output light intensity of a first slave apparatus positioned at the upper stream of a second slave apparatus on the optical fiber line is compensated to a suitable light intensity by informing abnormal state of received light intensity of the second slave apparatus.

Further, the present invention can provide a loop-type optical fiber transmission system for detecting a slave apparatus which is in malfunction because of reception of light which is extensively deviated from a suitable light intensity.

The loop-type optical fiber transmission system in accordance with the present invention is configurated that:
the master apparatus comprises
a memory,
a CPU,
serial light signal transmission means and
serial light signal receiving means, and
receives a serial light signal including an address signal for specifying a slave apparatus and a status signal for informing malfunction of an incident light intensity of the slave apparatus, and
transmits a serial light signal including an address signal for specifying another slave apparatus which is at an upper stream position to the aforementioned slave apparatus and a command signal for controlling an output light intensity of a photoelectric converter of the another slave apparatus positioned at the upper stream,
each of respective slave apparatus comprises
light signal receiving means for receiving the serial light signal and converting it to a received transmission signal of a serial electric signal,
address setting means for setting an address specifying the slave apparatus,
address recognizing means for recognizing an address of the received transmission signal by comparing it with the address set in the address setting means,
an incident light intensity detector for detecting deviation of an intensity of the received transmission signal from a predetermined range,
a parallel-serial converter for converting the output of the incident light intensity detector into a serial status-signal,
first switch means for generating a serial transmission signal by switching selectively between the address signal of the received transmission signal and the output of the parallel-serial converter,
an electroptic converter for converting the serial transmission signal into an serial light signal, and
a light intensity controller for controlling an output light intensity of the electroptic converter in the upper stream position on the basis of the command signal from the master apparatus.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 6($a$-1) and FIG. 6(P) are waveform charts of the signals showing compensation operation of transmission light intensity in the slave apparatus;

FIG. 8($b$) is a circuitry of an example of an incident light intensity detector;

FIG. 9($n$), FIG. 9($a$-1), FIG. 9($a$), FIG. 9($z$), FIG. 9($f$), FIG. 9($m$), FIG. 9($w$), FIG. 9($d$) and FIG. 9($s$) are waveform charts of the signals showing operation of the second embodiment;

DESCRIPTION OF THE PREFERRED EMBODIMENTS

Figure 1:
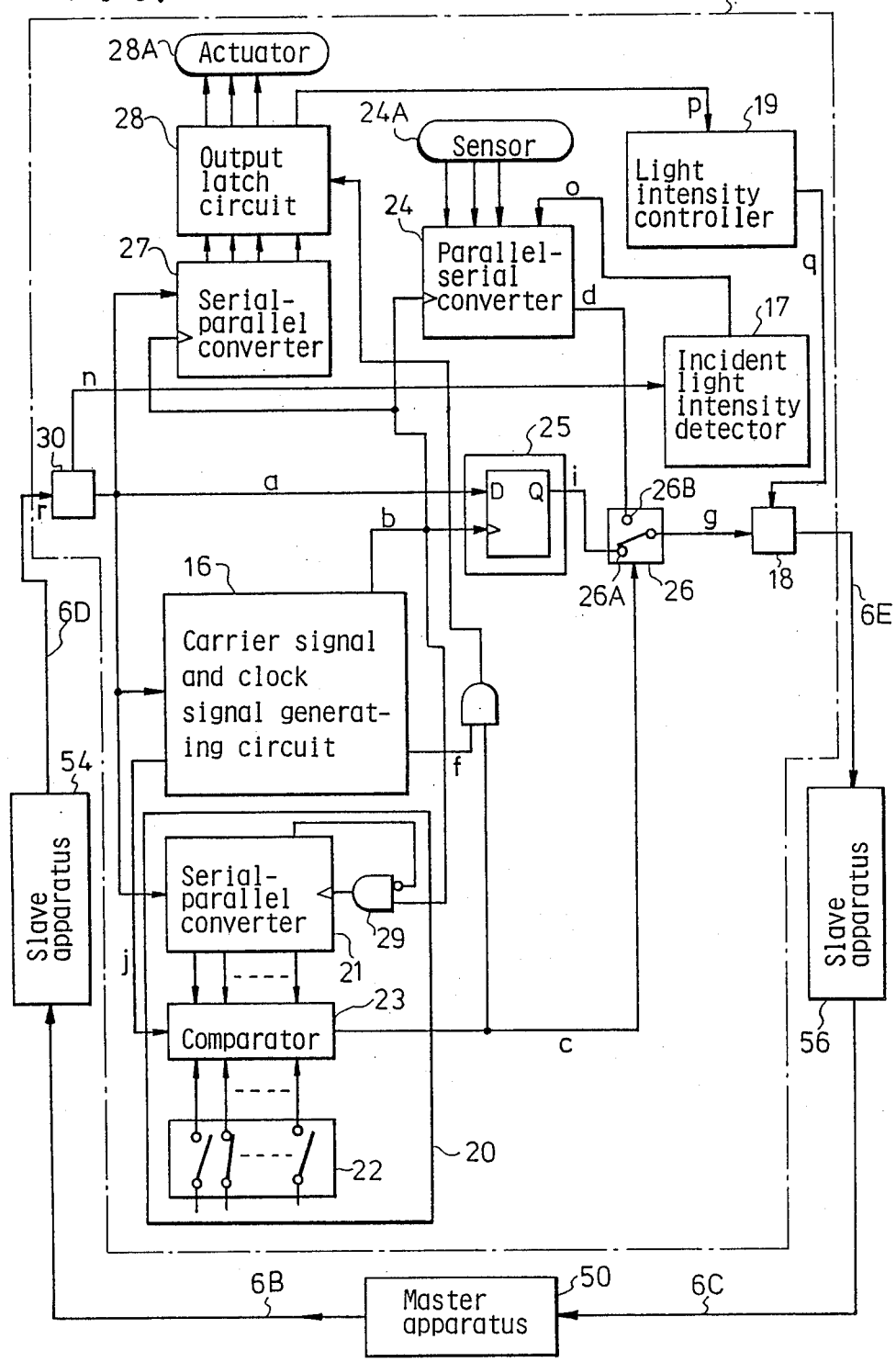
FIG. 1 is a block diagram of a slave apparatus of a first embodiment in accordance with the present invention.

FIG. 1 is a block diagram of a first embodiment of a slave apparatus in the loop-type optical fiber transmission system in accordance with the present invention.

Figure 2:
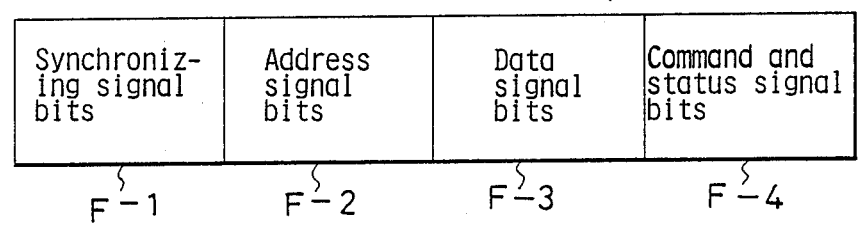
FIG. 2 is a format of a transmission signal.

FIG. 2 is a format of a transmission signal in the embodiment. The format is composed of synchronizing signal bits F-1, address signal bits F-2, data signal bits F-3 and command and status signal bits F-4. The synchronizing signal of the synchronizing signal bits F-1 serves to generate a carrier signal "b" in a carrier signal and clock signal generating circuit 16 in FIG. 1.

Figure 3:
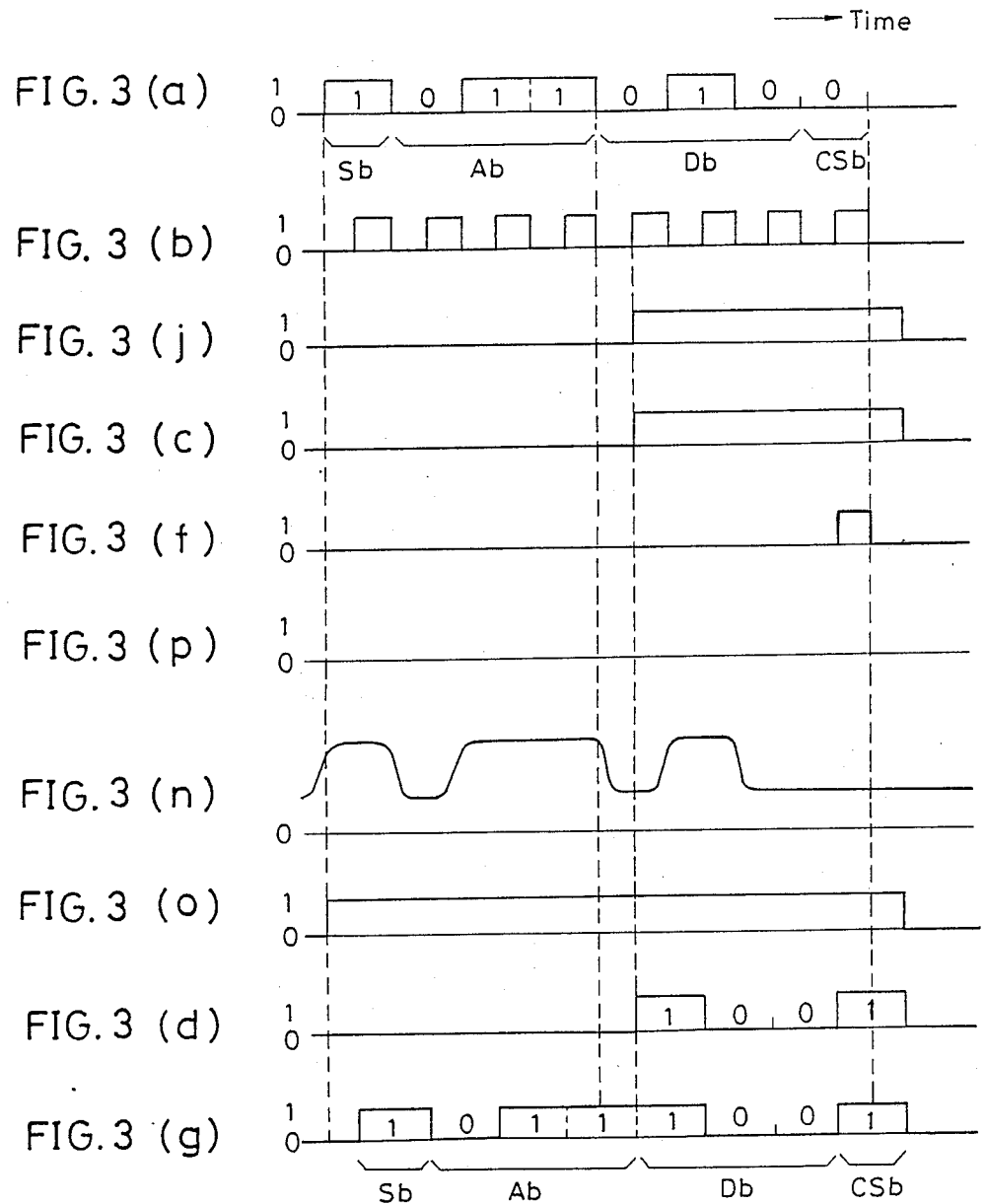
FIG. 3($a$), FIG. 3($b$), FIG. 3($j$), FIG. 3($c$), FIG. 3($f$), FIG. 3($p$), FIG. 3($n$), FIG. 3($o$), FIG. 3($d$) and FIG. 3($g$) are waveform charts of the respective signals in operation of the slave apparatus.

Referring to FIG. 1, the transmission signal of a serial digital light signal is sent from a master apparatus 50 via an optical fiber 6B. The transmission signal is inputted to a slave apparatus 55 through a slave apparatus 54 which is positioned at the upper stream part with respect to a light proceeding direction, and is converted into a received transmission signal "a" of a serial digital electric signal as shown in FIG. 3($a$) by an optoelectric converter 30. The received transmission signal "a" is composed of a synchronizing signal $S_b$, an address signal $A_b$, data signal $D_b$ and a command and status signal $CS_b$.

The received transmission signal "a" is inputted to a serial-parallel converter 27, carrier-clock circuit 16 and an address coincidence circuit 20. The carrier-clock circuit 16 is for generating a carrier signal "b", an output latch timing signal "f" and a serial signal switching signal "j" as shown in FIG. 3(b), FIG. 3(f) and FIG. 3(j), respectively. The carrier signal "b" makes the received transmission signal "a" synchronize with the received transmission signal "a" with a phase delay of half bit. An address coincidence circuit 20 is composed of a serial-parallel converter 21 for converting a serial signal to a parallel signal, a comparator 23 for comparing the address signal bits F-2 of the received transmission signal "a" with the address set on an address setting circuit 22 and a gate 29.

A serial-parallel converter 27 converts a serial signal of the data signal bits F-3 of the received transmission signal "a" to a parallel signal. An output latch circuit 28 memorizes the data signal of the data signal bits F-3 and outputs them to an actuator 28A. A parallel-serial converter 24 converts a parallel input signal from a sensor 24A to a serial signal "d", in synchronism with the carrier signal "b" issued from the carrier signal as shown in FIG. 3. A serial signal delay circuit 25 retards the received transmission signal "a" so that the phase of the received transmission signal "a" coincides with a serial signal "d" which is output from the parallel-serial converter 24. In the embodiment, the carrier signal "b" is applied to a D-type flip-flop of the serial signal delay circuit 25 as a clock signal, and thereby the received transmission signal "a" is delayed until the same timing of the serial signal "d" which is output from the parallel-serial converter 24.

Data transmission switch 26 is controlled by the address coincidence signal "c" from the comparator 23. When the address coincidence signal "c" is not applied to the data transmission switch 26, which is switched to a contact 26A and the received transmission signal "a" is applied to the electroptic converter 18. When the address coincidence signal "c" is applied to the data transmission switch 26, which is switched to a contact 26B, the serial signal d is applied to the electroptic converter 18. Consequently, the input data from the sensor 24A is inserted into the data signal bit F-3.

When the address signal bits F-2 do not coincide with the address set by the address setting circuit 22 and the address coincidence signal "c" is not output, the received transmission signal "a" is transmitted to an electroptic converter 18 through the serial signal delay circuit 25 for transmitting the received transmission signal "a" to a next successive slave apparatus 56.

The optoelectric converter 30 outputs an analog output "n" proportional to the intensity of an incident light "r" from the optical fiber. An incident light intensity detector 17 detects intensity of the incident light "r", and when the intensity of the incident light is lower than a predetermined value, an alarm signal "o" indicating deficiency of the light intensity is output as shown in FIG. 3(0).

A light intensity controller 19 controls an output light intensity of the electroptic converter 18 by applying an output signal "q" on the basis of a signal "p" which is issued from the output latch circuit 28 as shown in FIG. 6(p). In the embodiment, when the signal "p" which is transmitted from the master apparatus by the command and status signal bits F-4 as shown in FIG. 2 is high level, the output light intensity of the electroptic converter 18 is increased. After then, the output light intensity is maintained in the increased status.

The address signal of the address signal bit F-2 designates a slave apparatus to be accessed. The data signal of the data signal bit F-3 is to control the actuator 28A, on the other hand, input data from a sensor 24A of a slave apparatus 55 is loaded on the data signal bits F-3 and is transmitted to the master apparatus 50. In the command and status signal bits F-4, a command signal for giving a command to the slave apparatus 55 or a status signal for informing status of the slave apparatus 55 is loaded. In the embodiment, a command signal for adjusting the output light intensity from any slave apparatus 54, 55, 56 ..., is sent from the master apparatus 50 to the slave apparatuses, and a status signal for informing abnormal state of the incident light intensity in the slave apparatus 55 is sent from the slave apparatus 55 to the master apparatus 50.

Figure 4:
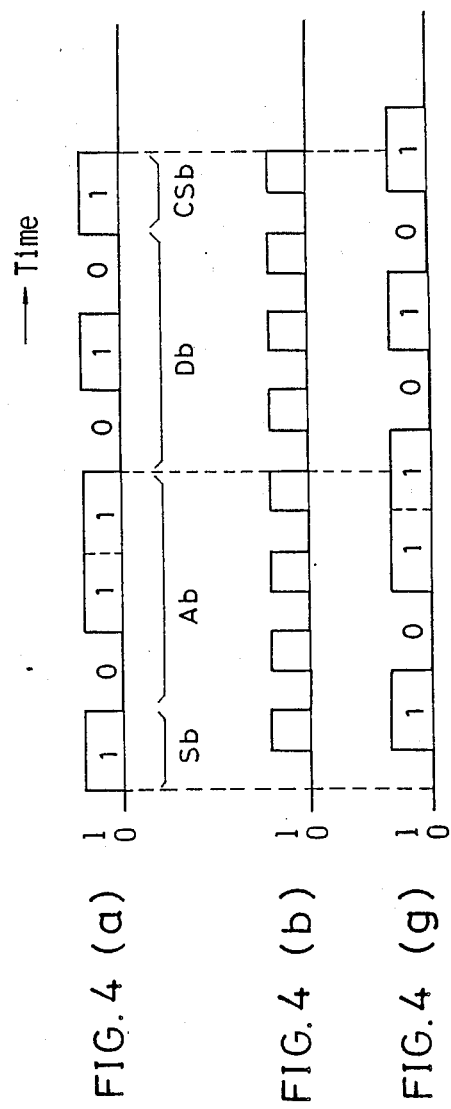
FIG. 4($a$), FIG. 4($b$) and FIG. 4($g$) are waveform charts of the signals showing operation in inconformity state of address.
Figure 5:
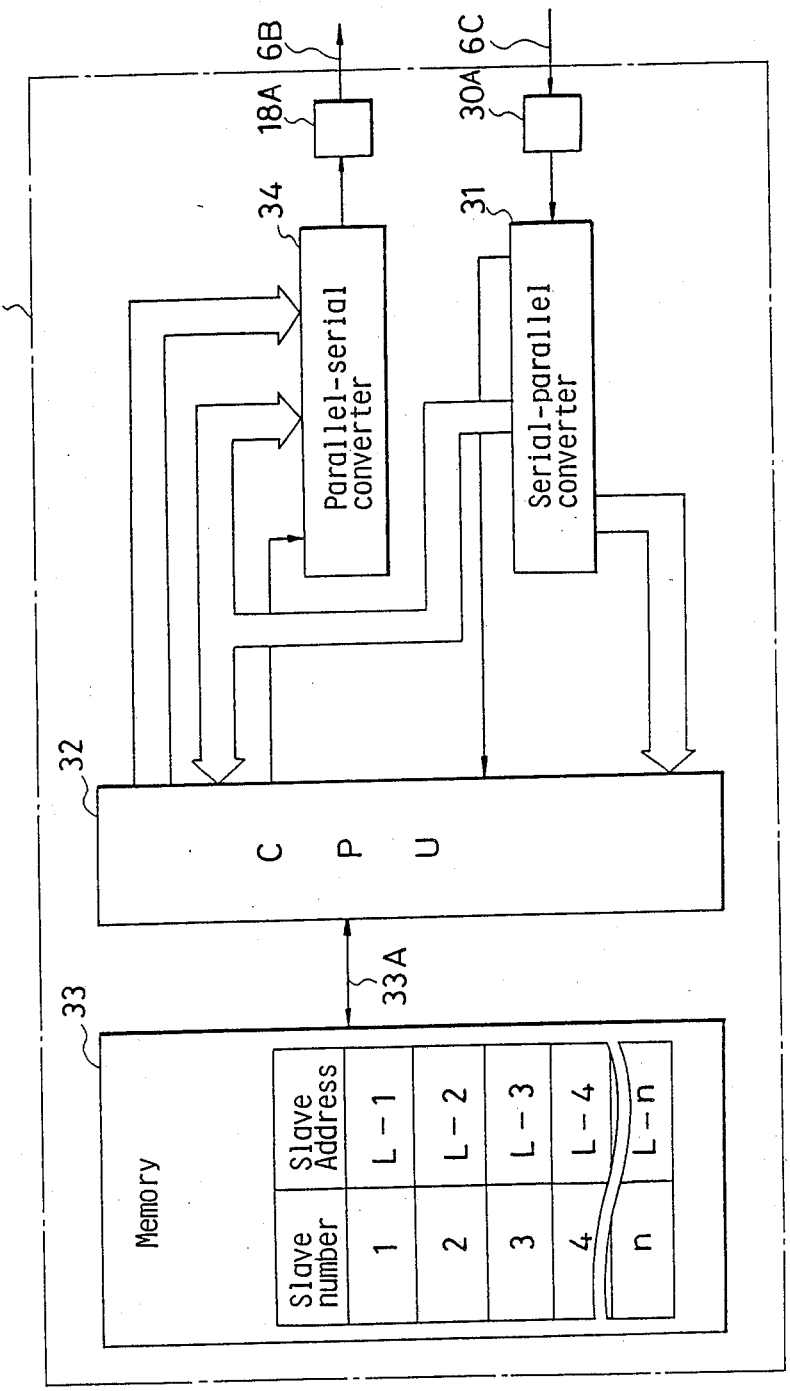
FIG. 5 is a block diagram of a master apparatus of the loop-type optical fiber transmission system in accordance with the present invention.

FIG. 5 is a block diagram of the master apparatus 50 of the loop-type optical fiber transmission system. Referring to FIG. 5, number of a plurality of slave apparatus and their address are memorized in a memory 33 which is connected to a CPU 32 through a data bus 33A. A data signal and a command and status signal are added to the data from the memory 33 in the CPU 32. And a transmission signal of a parallel signal is converted to a serial signal by a parallel-serial converter 34 and is inputted to an electroptic converter 18A for converting to an optical signal. A radiated light transmission signal from the electroptic converter 18 is transmitted to a slave apparatus 54 through the optical fiber 6B. Moreover, the light transmission signal is transmitted to a slave apparatus 55 via an optical fiber 6D. An example of the light transmission signal is shown in FIG. 4(a).

A returned optical signal from a slave apparatus through an optical fiber 6C is converted to an electric signal by an optoelectric converter 30A for converting the optical signal to an electric signal. Subsequently, the electric signal is converted to a parallel electric signals by a serial-parallel converter 31, and is inputted to the CPU 32. In the CPU, status of the slave apparatus is recognized and a command signal is generated.

Waveform charts as shown in FIG. 3(a)–FIG. 3(g) shown signals of the respective circuit of the slave apparatus in which the address in the received transmission signal of the slave apparatus coincides with the address set in the slave apparatus. Waveform charts as shown in FIG. 4(a)–FIG.4(g) show signals of the respective circuit of the slave apparatus when the address does not coincide with the address set in the slave apparatus. In this case, the received transmission signal "a" is converted by the serial signal delay circuit 25 to a transmission signal "g" which has a phase delay of a time period of half bit and transmitted to 18.

Operation of the first embodiment is elucidated hereafter. In FIG. 1, an optical signal from the master apparatus 50 is converted to an electric signal by the optoelectric converter 30, and is applied to the carrier-clock circuit 16, the address coincidence circuit 20, the serial-parallel converter 27, the serial signal delay circuit 25 and the incident light intensity detector 17. The carrier-clock circuit 16 generates the carrier signal "b", an output latch timing signal "f" and a serial signal switching signal "j". The received transmission signal "a" is applied to the address coincidence circuit 20 and is converted to a parallel signal therein by the serial-parallel converter 21, in synchronism with the carrier signal "b" given through a gate circuit 29. The address of the slave apparatus 55 is previously set in the address setting circuit 22, and the output of the serial-parallel-converter 21 is compared by the comparator 23 with the address which is set in the address setting circuit 22. When both the addresses coincide each other, an address coincidence signal "c" is output from the comparator 23.

On the other hand, the received transmission signal "a" is converted to the parallel signal by the serial-parallel converter 27, and a data signal in the data signal bits F-3 is read out and is latched in the output latch circuit 28. The data signal, for example, has data for driving the actuator 28A of the slave apparatus 55. The output parallel signal from the serial-parallel converter 28 is converted to a serial signal by the parallel-serial converter 24, and a signal (d) is output.

The data transmission switch 26 is switched to the side of contact 26B when the address coincidence signal "c" shown in FIG. 3(c) is applied thereto. Then a serial signal "d" showing the data of the sensor 24A and the incident light intensity detector 17 is added to the output "i" of the serial signal delay circuit 25, and a transmission signal "g" is generated. The transmission signal "g" is applied to the photo-electric converter 18 and is converted to an optical output signal. The optical output signal is transmitted to a next successive slave apparatus 56 via the optical fiber 6E. The waveform chart of the output optical signal is shown in FIG. 3(g). In the waveform chart of FIG. 3(g), the data signal bits F-3 and the command and status signal bits F-4 are replaced with data which are different from the received transmission signal "a" as shown in FIG. 3(a).

The optoelectric converter 30 generates an analog signal "n" which is proportional to the intensity of the received light when it converts the optical signal "r" to the electric signal. The analog signal "n" is examined in the incident light intensity detector 17 to examine whether the intensity of the incident light is within a predetermined suitable range. In case that the intensity of the incident light is lower than the predetermined value, an incident light malfunction signal "o" is output from the incident light intensity detector 17. The incident light malfunction signal "o" is latched until completion of receipt of the received transmission signal "a". Then, the incident light malfunction signal "o" is inserted into the command and status signal bits F-4 of the transmission signal "g". At the same time, the data of the data signal bits F-3 is replaced with input data from the sensor 24A. FIG. 3(g) is the waveform chart showing a newly generated transmission signal including the incident light malfunction signal "o".

In case that the address shown by the address signal Ab of the received transmission signal "a" does not coincide with the address of the slave apparatus 55, the data transmission switch 26 maintains connection to the contact 26A because of absence of the address coincidence signal "c". The received transmission signal "a" is inputted to the serial signal delay circuit 25. On the other hand, the carrier signal "b" is inputted to the serial signal delay circuit 25, and the output of the serial signal delay circuit 25 which is identical with the received transmission signal "a" in waveform chart is generated as shown in FIG. 4(g). However, the transmission signal "g" is delayed from the received transmission signal "a". In the above-mentioned case, data in the data signal bits F-3 and the command and status signal portion F-4 are not changed. Consequently, the same signal which is received by the optoelectric converter 30 is output from the electroptic converter 18.

Referring to FIG. 1, in case that the slave apparatus 55 transmits a transmission signal "g" including the incident light malfunction signal "o" in the command and status signal bits F-4, the incident light malfunction signal "o" is recognized by the master apparatus 50 on the basis of the address of the slave apparatus 55. The master apparatus 50, which is informed of malfunction of the incident light on the slave apparatus 55, identifies a slave apparatus 54 which is positioned in upstream part of the slave apparatus 55 with respect to the transmitting direction of the optical signal in the optical fiber 6D on the basis of the arrangement order in the memory 33 of the master apparatus 50. The slave apparatus 54 and the slave apparatus 56 are identical with the slave apparatus 55 in configuration, and only the addresses thereof set in the address setting circuit 22 are different from the slave apparatus 55. Subsequently, the master apparatus 50 transmits a transmission signal having a command signal for increasing light intensity of the electroptic converter 18 of the slave apparatus 54 in the command and status signal bits F-4.

Figure 6:
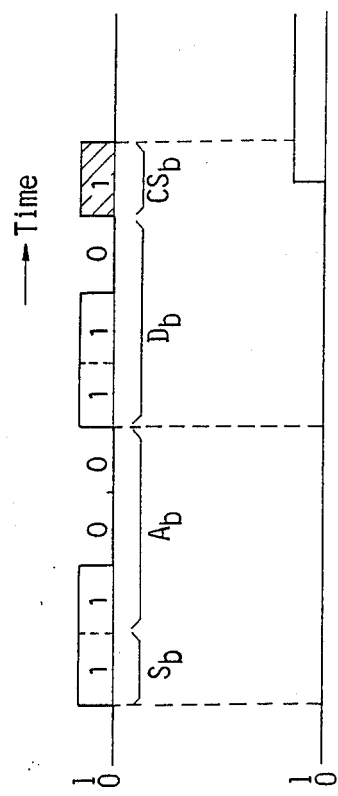

A transmission signal "a-1" having the command signal as the command and status signal $CS_b$ is shown in FIG. 6(a-1). In the waveform chart of FIG. 6(a-1), the hatched command and status signal $CS_b$ is made "1", and thereby the light intensity of the slave apparatus 54 is increased by the signal as shown in FIG. 6(p). In the slave apparatus 54, the command signal $CS_b$ in the command and status signal bits F-4 is output from the output latch circuit 28 as a signal "p", and is applied to the light intensity controller 19. The light intensity controller 19 serves to increase the intensity of output light of the electroptic converter 18. Consequently, intensity of the light signal received by the slave apparatus 55 increases, and malfunction in the light intensity is eliminated. The output light intensity of the slave apparatus 54 is maintained the increased value until receipt of other command.

The transmission signal "g" as shown in FIG. 3(g) are allotted one bit, three bits, three bits and one bit to the synchronizing signal $S_b$, the address signal $A_b$, the data signal $D_b$ and the command and status signal $CS_b$, respectively. These bit numbers are set to a suitable number in accordance with the data volume.

In the above-mentioned embodiment, in order to reduce the number of bits of the transmission signal "g", the command signal which is sent from the master apparatus 50 to the slave apparatus 55 and the status signal which is sent from the slave apparatus 55 to the master apparatus 50 are transmitted in the common bit of the command and status signal bits F-4 which is commonly used for the command signal and status signal, but these can be transmitted by the respective bits by increasing the number of bit.

Furthermore, in case that only one slave apparatus is connected to the master apparatus 50, the master apparatus 50 must be provided with an incident light intensity detector 17 and a light intensity controller 19. In compensation for that, the address signal bits F-2 is not necessary in the above-mentioned case.

A second embodiment of the loop-type optical fiber transmission system is explained with reference to FIG. 7, FIG. 8(a), FIG. 8(b) and FIG. 9.

Figure 7:
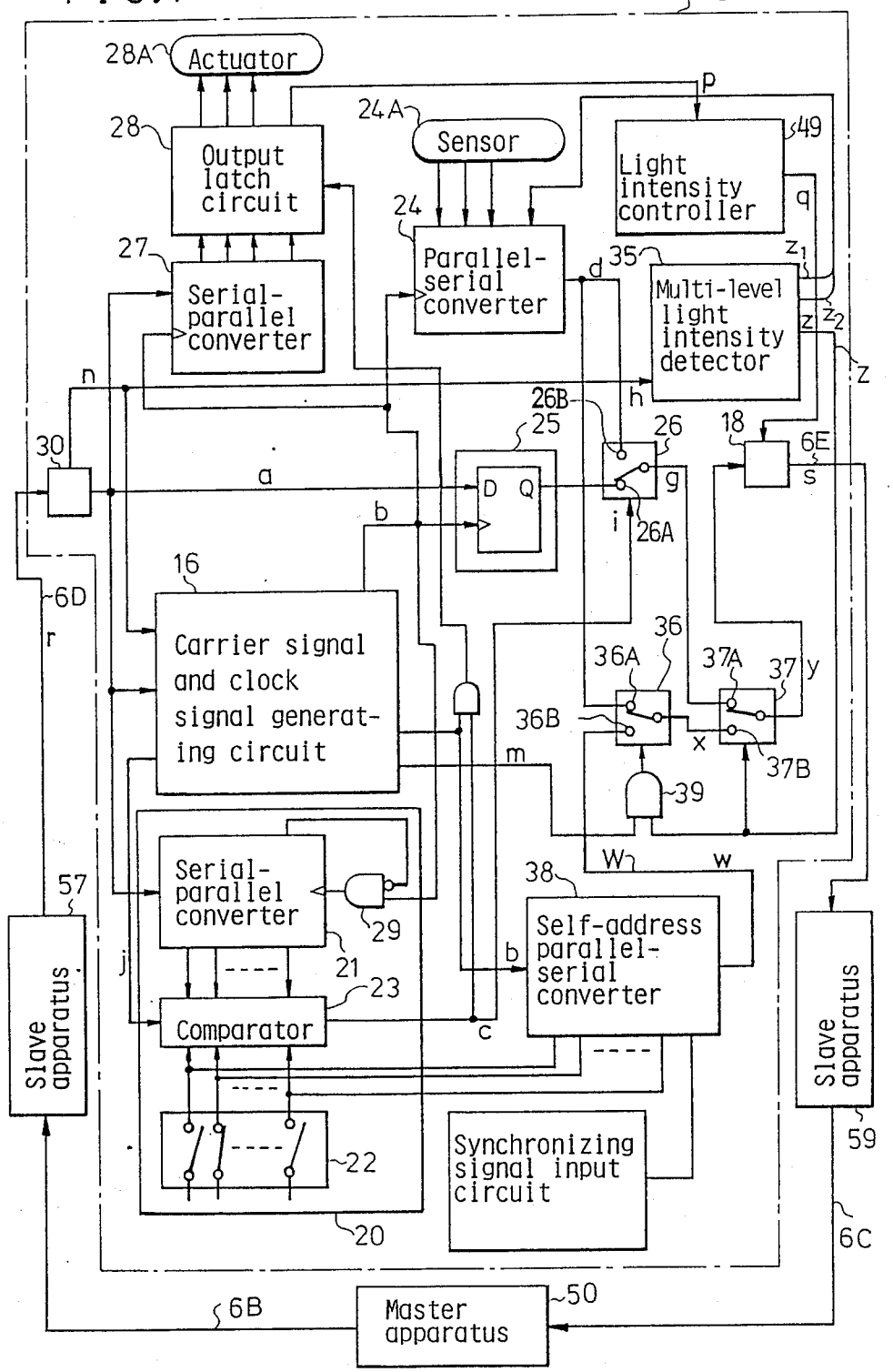
FIG. 7 is a block diagram of a slave apparatus in a second embodiment of the loop-type optical fiber transmission system of the present invention.

FIG. 7 is a block diagram of a slave apparatus 58, connected with the slave apparatus 58 and 59 in the second embodiment. The second embodiment is distinguished from the first embodiment by comprising a multi-level light intensity detector 35, switches 36 and 37, a self-address parallel-serial converter 38 and a gate 39, and remaining circuits are identical with the first embodiment.

Figure 8A:
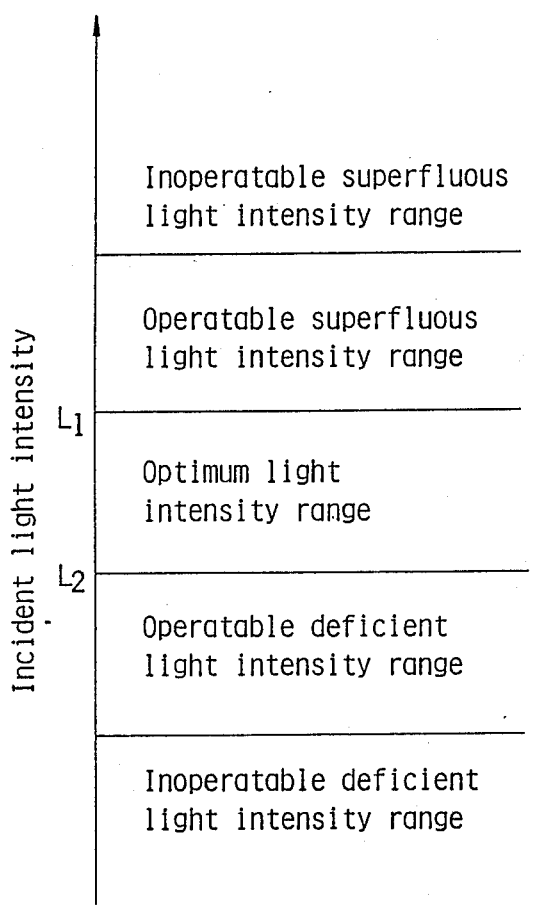
FIG. 8($a$) is a chart showing ranges of received light intensity corresponding to a light transmission state.

In the second embodiment, an incident light is detected by dividing the intensity of the incident light into three levels. Referring to FIG. 8(a) which shows intensity levels of the incident light, in an "Inoperatable superfluous light intensity range" the slave apparatus falls into malfunction because of the superfluity of the incident. On the contrary, in an "Inoperatable deficient light intensity range", the slave apparatus also falls in malfunction due to deficient of the light intensity. In an "operatable superfluous light intensity range" or an "operatable deficient light intensity range", the light intensity is superfluous or deficient, respectively, but in either case, the slave apparatus is operable. An "optimum light intensity range" shows an optimum intensity range of the incident light. In this embodiment, incident light is within the "operatable superfluous light intensity range" or the "operatable deficient light intensity range", and the multi-level light intensity detector 35 generates outputs showing the respective malfunction status.

Figure 8B:
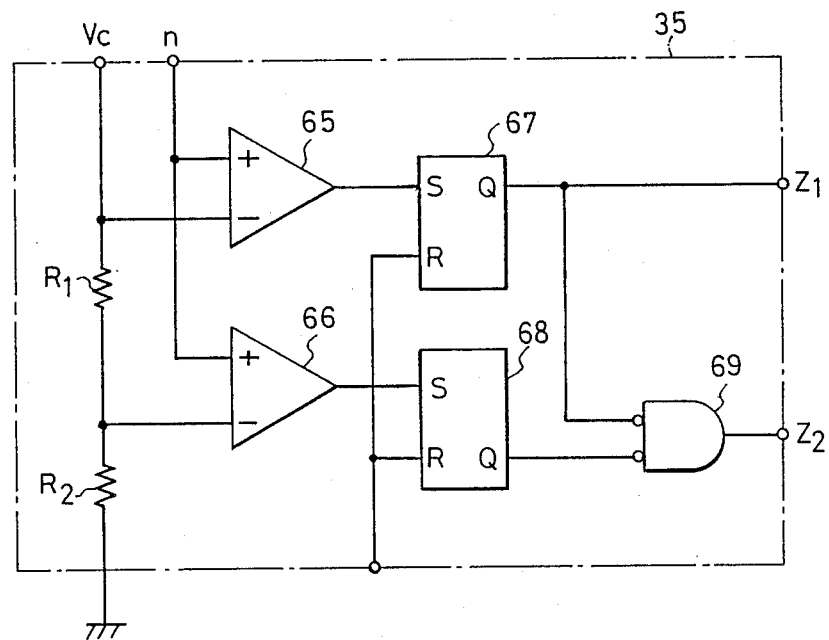
Figure 10:
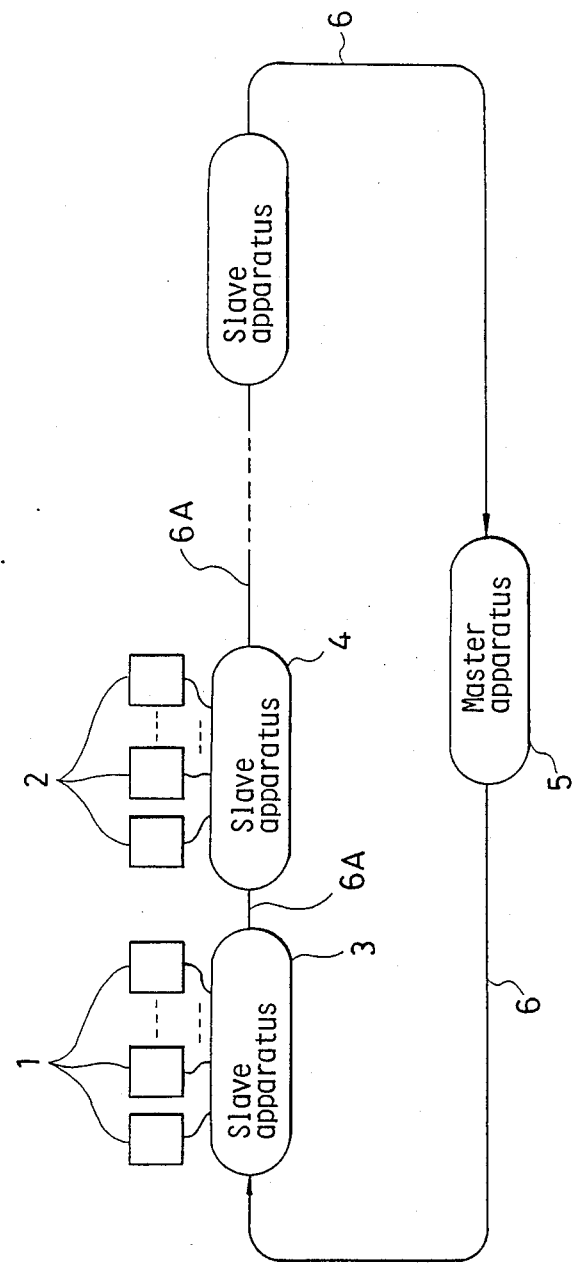
FIG. 10 is the block diagram of the loop-type optical fiber transmission system in the conventional art.
Figure 11:
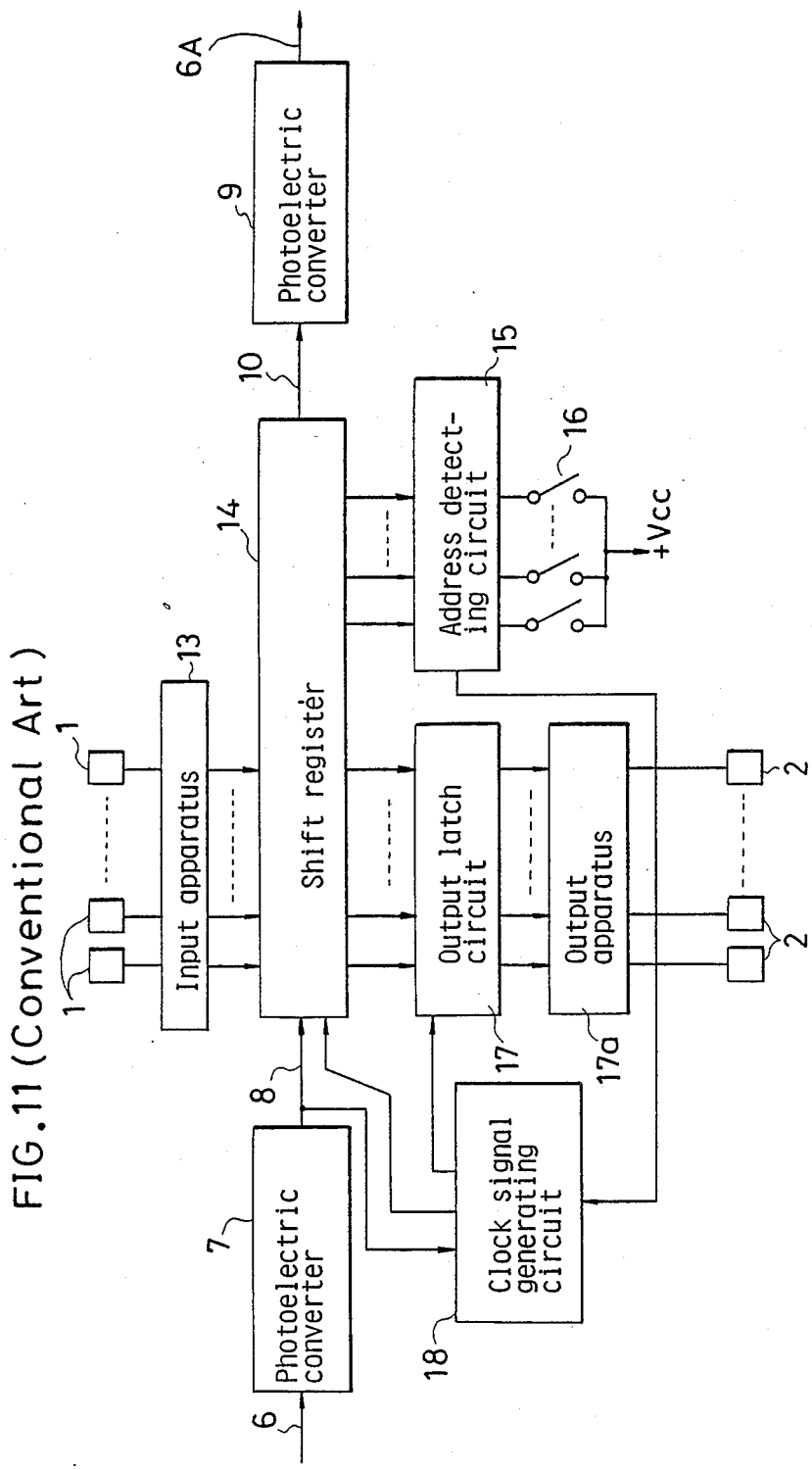
FIG. 11 is the block diagram of the slave apparatus in the conventional art.
Figure 12:
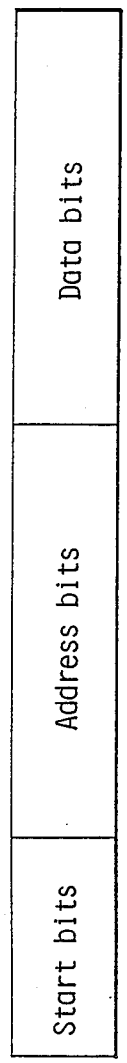
FIG. 12 is the chart showing the format of the transmission signal in the conventional art.

FIG. 8(b) is a circuit of the multi-level light intensity detector 35. Referring to FIG. 8(b), an analog output "n" of the optoelectric converter 30 is applied to the noninvert inputs of two comparators 65 and 66. Reference voltages which are different from each other are applied to the respective invert inputs thereof through resistors $R_1$ and $R_2$, and the reference voltage for the comparator 65 is made to be higher than that of the comparator 66. Accordingly, the output of the comparator 65 becomes high level "1" at a relative higher level of the analog output "n", and the output of the comparator 66 becomes a relative lower voltage of the analog output "n". The outputs of the respective comparators 65 and 66 are latched by the respective flip-flops 67 and 68 and are output to the respective output terminals $Z_1$ or $Z_2$ through and AND gate 69. In an actual operation, when the analog output "n" is higher than the level $L_1$ in FIG. 8(a), the output terminal $Z_1$ turns "1". On the other hand, the analog output "n" is in the range between the level $L_1$ and the level $L_2$, both the outputs of the output terminals $Z_1$ and $Z_2$ remain "0". When the analog output "n" is lower than the level $L_2$, the output of the output terminal $Z_2$ turns "1".

The outputs of the respective output terminals $Z_1$ and $Z_2$ of the multi-level light intensity detector 35 are input to the parallel-serial converter 24, and is converted to a command and status signal "d" of two bits. And they are applied to the contact 26B of the switch 26. Furthermore, when the output of the output terminal $Z_1$ or the output terminal $Z_2$ is "1", the light intensity malfunction signal "z" of the output Z of the multi-level light intensity detector 35 turns "1" as shown in FIG. 9(z). The switch 37 is activated by the light intensity malfunction signal "z" and is switched to the side of contact 37B.

The self-address parallel-serial converter 38 converts the address signal set in the address setting circuit 22 to a serial signal, and a self-address signal "w" in which the address signal is combined with the synchronizing signal in the synchronizing signal bits F-1 is output to an output line W in FIG. 7 in synchronism with the received transmission signal "a". The output line W is coupled to a contact 36B of the switch 36, and the contact 36A thereof is coupled to the output of the parallel-serial converter 24. The switch 36 is controlled by the output of a gate 39 which issues an output at reception of the address-data switching signal "m" and the light intensity malfunction signal "z" as shown in FIG. 9, and is switched to the contact 36B.

Referring to FIG. 9, in case that the light intensity of the received transmission signal is lower than a predetermined level, and the analog signal "n" is lower than the level $L_2$ as shown in FIG. 8(a), the received transmission signal is greatly distorted as shown in FIG. 9(a). On the contrary, in case that the light intensity of the received transmission signal is higher than a predetermined level, and the analog signal "n" is higher than the level $L_1$ as shown in FIG. 8(a), the received transmission signal "a" is saturated as shown in FIG. 9(a-1). Accordingly, the data in the transmission signal can not be read out in the slave apparatus 58. The head of the received transmission signal "a" of FIG. 9(a), however, can be detected, and the carrier signal "b" and the address-data switching signal "m" are generated from the carrier signal and clock signal generating circuit 16. Deficiency of the light intensity of the received transmission signal is detected by the multi-level light intensity detector 35, and the light intensity malfunction signal "z" as shown in FIG. 9(z) is output.

The light intensity malfunction signal "z" activates the switch 37 to switch it to the side of contact 37B. Furthermore, the light intensity malfunction signal "z" is applied to the input of the gate 39. On the other hand, the address-data switching signal "m" is applied to the other input of the gate 39. As in FIG. 9, the address-data switching signal "m" is "o" during the time period of the synchronizing signal $S_b$, and the address signal $A_b$ of the received transmission signal "a", and is "1" during the time period of the data signal $D_b$ and the command and status signal $CS_b$. As shown in FIG. 7, when the address-data switching signal "m" turns "1", the gate 39 issues an output and activates the switch 36 and switches it to the contact 36B. Then, the self-addressed signal "w" is applied to the electroptic converter 18 via the switches 36 and 37, and is converted to an optical transmission signal and is transmitted to the master apparatus 50. In the master apparatus 50, the status signal in the command and status signal bits F-4 of the transmission signal is read out, and the slave apparatus which is in the malfunction status is recognized.

Subsequently, the master apparatus 50 sends a command signal to make increase the output light intensity of the slave apparatus 57 which is positioned at upper stream of the slave apparatus 58. In the slave apparatus 57, the command signal $CS_b$ in the command and status signal bits F-4 is output from the output latch circuit 28 (FIG. 7) as a signal "p" of two bits, and is applied to the light intensity controller 49. The light intensity controller 49 serves to change the intensity of output light of the electroptic converter 18. Consequently, intensity of the light signal received by the slave apparatus 58 positioned at the down stream part of the slave apparatus 57 increases. In the embodiment, the light intensity controller 49 has a D/A converter of two bits, and the command signal $CS_b$ of two bits is converted to the analog signal "q".

In the second embodiment, in case that level of the transmission light received by a slave apparatus is seriously reduced, due to partial breakage of the optical fiber and the received transmission signal can not be decoded, for example, a transmission signal with the self-address is created in the slave apparatus. Furthermore, the output light intensity of the slave apparatus 57 positioned at the upper stream part to the slave apparatus 58 is varied by the command signal from the master apparatus 50. Consequently, operable range of the transmission light intensity is widened.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A loop-type optical fiber transmission system comprising a master apparatus and a plurality of slave apparatus connected in series by optical fibers, said master apparatus comprising:
    a first optic-electric converter for receiving from one of said plurality of slave apparatus a serial light status signal and converting the serial light status signal to a serial electric status signal;
    a first serial-parallel converter for converting the serial electric status signal to a parallel electric status signal;
    a memory for storing addresses specifying respective slave apparatus addresses;
    a CPU for recognizing from the parallel electric status signal a status of departure of incident light intensity of a first slave apparatus and for generating a parallel signal including (i) an address from said memory specifying a second slave apparatus, which is connected at a former position on said loop from the first slave apparatus with respect to an advancing direction of serial light signals and (ii) a command signal for controlling an output light intensity of the second slave apparatus;
    a first parallel-serial converter for converting the parallel signal generated by said CPU to a serial electric transmission signal; and
    a first electric-optic converter for converting the serial electric transmission signal to a serial light transmission signal and transmitting the serial light transmission signal onto said loop toward said slave apparatus; and each said slave apparatus comprising:
    a second optic-electric converter for receiving a serial light transmission signal and converting the serial light transmission signal to a serial electric transmission signal;
    address setting means for setting an address specifying said slave apparatus;
    a second serial-parallel converter for converting the serial electric transmission signal to a first parallel electric transmission signal;
    an address comparator for comparing an address of the first parallel electric transmission signal to the address set in said address setting means;
    a third serial-parallel converter for converting the serial electric transmission signal to a second parallel electric transmission signal;
    actuating means for extracting a data signal and a command signal from the second parallel electric transmission signal and outputting control signals only when the address of the first parallel electric transmission signal matches the address set in said address setting means;
    an incident light intensity detector for receiving from said second optic-electric converter an electric analog signal of the serial light transmission signal and detecting status of departure of an intensity of the serial light transmission signal from a predetermined range and outputting a malfunction signal;
    a second parallel-serial converter for converting a parallel electric sensor signal including the malfunction signal from said incident light intensity detector to a serial electric signal;
    a serial signal delay circuit for delaying the serial electric transmission signal from said second optic-electric converter;
    switch means for generating a serial electric status signal by switching selectively between a delayed serial electric transmission signal from said serial signal delay circuit and the signal from said second parallel-serial converter, selectively choosing the signal from said second parallel-serial converter only when the address of the first parallel electric transmission signal matches the address set in said address setting means;
    a second electric-optic converter for converting serial electric status signal from said switch means to a serial light status signal and transmitting the serial light status signal onto said loop toward said master apparatus;
    a light intensity controller for receiving the command signal extracted by said actuating means and controlling an output light intensity of said second electric-optic converter; and
    a carrier signal and clock signal generating circuit for receiving the serial electric transmission signal from said second optic-electric converter and providing timing to said second serial-parallel converter, said third serial-parallel converter, said second parallel-serial converter, said address comparator, said actuating means, and said serial signal delay circuit.

2. A loop-type optical fiber transmission system comprising a master apparatus and a plurality of slave apparatus connected in series by optical fibers, said master apparatus comprising:
    a first optic-eletric converter for receiving from one of said plurality of slave apparatus a serial light status signal and converting the serial light status signal to a serial electric status signal;
    a first serial-parallel converter for converting the serial electric status signal to a parallel electric status signal;
    a memory for storing addresses specifying respective slave apparatus addresses;
    a CPU for recognizing from the parallel electric status signal a status of departure of incident light intensity of a first slave apparatus and for generating a parallel signal including (i) an address from said memory specifying a second slave apparatus, which is connected at a former position on said loop from the first slave apparatus with respect to an advancing direction of serial light signals and (ii) a command signal for controlling an output light intensity of the electroptic converter of the second slave apparatus;
    a first parallel-serial converter for converting the parallel signal generated by said CPU to a serial electric transmission signal; and
    a first electric-optic converter for converting the serial electric transmission signal to a serial light transmission signal and transmitting the serial light transmission signal onto said loop toward said slave apparatus; and each said slave apparatus comprising:

a second optic-electric converter for receiving a serial light transmission signal and converting the serial light transmission signal to a serial electric transmission signal;

address setting means for setting an address specifying said slave apparatus;

a second serial-parallel converter for converting the serial electric transmission signal to a first parallel electric transmission signal;

an address comparator for comparing an address of the first parallel electric transmission signal to the address set in said address setting means;

a third serial-parallel converter for converting the serial electric transmission signal to a second parallel electric transmission signal;

actuating means for extracting a data signal and a command signal from the second parallel electric transmission signal and outputting control signals only when the address of the first parallel electric transmission signal matches the address set in said address setting means;

a multiple-level light intensity detector for receiving from said second optic-electric converter an electric analog signal of the serial light transmission signal and detecting status of departure of an intensity of the serial light transmission signal from predetermined levels and outputting malfunction signals;

a second parallel-serial converter for converting a parallel electric sensor signal including one of the malfunction signals from said multiple-level light intensity detector to a serial electric first signal;

a serial signal delay circuit for delaying the serial electric transmission signal from said second optic-electric converter;

first switch means for switching selectively between a delayed serial electric transmission signal from said serial signal delay circuit and the first signal from said second parallel-serial converter, selectively choosing the first signal from said second parallel-serial converter only when the address of the first parallel electric transmission signal matches the address set in said address setting means;

a self-address parallel-serial converter for converting a parallel electric signal of said address setting means to a serial electric second signal;

a synchronizing signal input circuit for synchronizing said self-address parallel-serial converter;

second switch means for switching selectively between the first signal from said parallel-serial converter and the second signal from siad self-address parallel-serial converter;

third switch means for generating a serial electric status signal by switching selectively between said first switch means and said second switch means, selectively choosing said first switch means only when the intensity of the transmission signal is one of above or below the predetermined levels;

a second electric-optic converter for converting the serial electric status signal from said third switch means to a serial light status signal and transmitting the serial light status signal onto said loop toward said master apparatus;

a light intensity controller for receiving the command signal extracted by said actuating means and controlling an output light intensity of said second electric-optic converter; and a carrier signal and clock signal generating circuit for receiving the serial electric transmission signal from said second optic-electric converter and providing timing to said second serial-parallel converter, said third serial-parallel converter, said second parallel-serial converter, said self-address parallel-serial converter, said second switch means, said address comparator, said actuating means, and said serial signal delay circuit.

3. A loop-type optical fiber transmission system comprising a master apparatus and a plurality of slave apparatus connected in series by optical fibers, each slave apparatus comprising:

light signal receiving means for receiving a serial light transmission signal including an address signal and converting the serial light transmission signal to a serial electric transmission signal;

address setting means for setting an address specifying said slave apparatus;

address recognizing means for recognizing an address of the transmission signal by comparing the address signal of the transmission signal to the address set in said address setting means;

an incident light intensity detector for detecting status of departure of an intensity of the serial light signal from a predetermined range and outputting a malfunction signal;

a parallel-serial converter for converting a parrallel electric signal including the malfunction signal from said incident light intensity detector to a serial electric signal representing the status of departure;

switch means for generating a serial status signal by switching selectively between the transmission signal and the signal from said parallel-serial converter; and an electroptic converter for converting the serial status signal from switch means to a serial light status signal for transmitting said onto loop toward said master apparatus.

4. A loop-type optical fiber transmission systen comprising a master apparatus and a plurality of slave apparatus connected in series by optical fibers, each slave apparatus comprising:

light signal receiving means for receiving a serial light transmission signal including an address signal and converting the serial light transmission signal to a serial electric transmission signal;

address setting means for setting an address specifying said slave apparatus;

address recognizing means for recognizing an address of the transmission signal by comparing the address signal of the transmission signal to the address set in said address setting means;

a multiple-level light intensity detector for detecting status of departure of an intensity of the serial light signal from predetermined levels and outputting a malfunction signal;

a parallel-serial converter for converting a parallel electric signal including the malfunction signal from said multiple-level intensity detector to a serial electric first signal representing the status of departure;

first switch means for switching selectively between the transmission signal and the first signal from said parallel-serial converter;

a self-address parallel-serial converter for converting a parallel signal from said address setting means to a serial electric second signal;

second switch means for switching selectively between the first signal from said parallel-serial converter and the second signal from said self-address parallel-serial converter;

third switch means for generating a serial status signal by switching selectively between said first switch means and said second switch means; and an electroptic converter for converting the serial status signal from said third switch means to a serial light status signal for transmitting onto said loop toward said master apparatus.

5. A loop-type optical fiber transmission system according to claims 3 or 4, wherein said master apparatus comprises:

serial light signal receiving means for receiving from one of said plurality of slave apparatus a serial light status signal and converting the serial light status signal to an electric status signal;

a memory for storing addresses specifying respective slave apparatus;

a CPU for recognizing from the status signal a status of departure of incident light intensity of a first slave apparatus and for generating a signal including (i) an address from said memory specifying a second slave apparatus, which is connected at a former position on said loop from the first slave apparatus with respect to an advancing direction of serial light signals and (ii) a command signal for controlling an output light intensity of the electroptic converter of the second slave apparatus; and serial light signal transmission means for converting the signal generated by said CPU to a serial light transmission signal and transmitting the serial light transmission signal onto said loop toward said slave apparatus.

6. A loop-type optical fiber transmission system according to claims 3 or 4, each slave apparatus further comprising actuating means for extracting a data signal from the transmission signal and outputting control signals only when said address recognizing means recognizes the address of the transmission signal.

7. A long-type optical fiber transmission system according to claim 3, each slave apparatus further comprising a carrier signal and clock signal generating circuit for providing timing to said address recognizing means and said parallel-serial converter.

8. A loop-type optical fiber transimission system according to claim 4, each slave apparatus further comprising a carrier signal and clock signal generating circuit for providing timing to said address recognizing means, said parallel-serial converter, said self-address parallel-serial converter and said second switch means.

9. A loop-type optical fiber transmission system according to claims 3 or 4, each slave apparatus further comprising a light intensity controller for controlling an output light intensity of said electroptic converter.

10. A loop-type optical fiber transmission system comprising a master apparatus and a plurality of slave apparatus connected in series by optical fibers, each slave apparatus comprising:

light signal receiving means for receiving a serial light transmission signal including an address signal, a data signal and a command signal and converting the serial light transmission signal to a serial electric transmission signal;

address setting means for setting an address specifying said slave apparatus;

address recognizing means for recognizing an address of the transmission signal by comparing the address signal of the transmission signal to the address set in said address setting means;

actuating means for extracting the data signal and the command signal from the transmission signal and outputting control signals only when said address recognizing means recognizes the address of the transmission signal;

an incident light intensity detector for detecting status of departure of an intensity of the serial light signal from a predetermined range and outputting a malfunction signal;

a parallel-serial converter for converting a parallel electric signal including the mnalfunction signal from said incident light intensity detector to a serial electric signal;

switch means for generating a serial status signal by switching selectively between the transmission signal and the signal from said parallel-serial converter;

an electroptic converter for converting said serial status signal from said switch means to a signal light status signal for transmitting onto said loop toward said master apparatus;

a light intensity controller for receiving the command signal extracted by said actuating means and controlling an output light intensity of said electroptic converter; and a carrier signal and clock signal generating circuit for providing timing to said address recognizing means, said actuating means, and said parallel-serial converter.

11. A loop-type optical fiber transmission system comprising a master apparatus and a plurality of slave apparatus connected in series by optical fibers, each slave apparatus comprising:

light signal receiving means for receiving a serial light transmission signal including an address signal, a data signal and a command signal and converting the serial light transmission signal to a serial electric transmission signal;

address setting means for setting an address specifying said slave apparatus;

address recognizing means for recognizing an address of the transmission signal by comparing the address signal of the transmission signal to the address set in said address setting means;

actuating means for extracing the data signal and the command signal from the transmission signal and outputting control signals only when said address recognizing means recognizes the address of the transmission signal;

a multiple-level light intensity detector for detecting status of departure of an intensity of the serial light signal from predetermined levels and outputting a malfunction signal;

a parallel-serial converter for converting a parallel electric signal including the malfunction signal from said multiple-level light intensity detector to a serial electric first signal;

first switch means for switching selectively between the transmission signal and the first signal from said parallel-serial converter;

a self-address parallel-serial converter for converting a parallal signal from said address setting means to a serial electric second signal;

second switch means for switching selectively between the first signal from said parrallel-serial converter and the second signal from said self-address parallel-serial converter;

third switch means for generating a serial status signal by switching selectively between said first switch means and said second switch means;

an electroptic converter for converting the serial status signal from said third switch means to a serial light status signal for transmitting onto said loop toward said master apparatus;

a light intensity controller for receiving the command signal extracted by said actuating means and controlling an output light intensity of said electroptic converter; and a carrier signal and clock signal generating circuit for providing timing to said address recognizing means, said actuating means, said parallel-serial converter, said self-address parallel-serial converter, and said second switch means.

12. A loop-type optical fiber transmission system according to claims 10 or 11, wherein said master apparatus comprises:

serial light signal receiving means for receiving from one of said plurality of slave apparatus a serial light status signal and converting the serial light status signal to an electric status signal;

a memory for storing respective slave apparatus addresses;

a CPU for recognizing from nthe status signal a status of departure of incident light intensity of a first slave apparatus and for generating a signal including (i) an addrress from said memory specifying a second slave apparatus, which is connected at a former position on said loop from the first slave apparatus with respect to an advancing direction of serial light signals and (ii) a command signal for controlling said light intensity controller of the second slave apparatus; and serial light signal transmission means for converting the signal generated by said CPU to a serial light transmission signal and transmitting the serial light transmission signal onto said loop toward said slave apparatus.

13. A loop-type optical fiber transmission system comprising a master apparatus and a plurality of slave apparatus connected in series by optical fibers, each slave apparatus comprising:

means for receiving a first light signal and converting the first light signal to an electric signal;

means for determining whether the electric signal specifies said slave apparatus;

means for detecting an intensity of the first light signal and outputting a malfunction signal;

means for selecting one of the electric signal and the electric signal including the malfunction signal;

means for converting a selected signal from said selecting means to a second light signal and transmitting the second light signal; and means for adjusting an intensity of the second light signal.

14. A loop-type optical fiber transmissionn system according to claim 13, wherein said master apparatus comprises:

means for receiving a third light signal and converting the third light signal to a first electric signal;

means for determining when a first slave apparatus has detected an improper intensity of the first light signal, specifying a second slave apparatus connected at a former position on said loop from the first slave apparatus with respect to an advancing direction of light signals, and generating a second electric signal to control the second slave apparatus to adjust an intensity of the second light signal; and means for converting the second electric signal to a fourth light signal and transmitting the fourth light signal.

15. A loop-type optical fiber transmission system according to claim 13, wherein said each slave apparatus further comprises a means for generating a slave apparatus identity signal.

16. A loop-type optical fiber transmission system according to claim 15, wherein said selecting means selects at least one of the electric signal, the malfunction signal, and the slave apparatus identity signal.

* * * * *